United States Patent
Keutgen

(10) Patent No.: US 11,230,258 B2
(45) Date of Patent: Jan. 25, 2022

(54) ANTITHEFT PROTECTIVE APPARATUS FOR A VEHICLE

(71) Applicant: Continental Automotive GmbH, Hannover (DE)

(72) Inventor: Andreas Keutgen, Mayschoss (DE)

(73) Assignee: Continental Automotive GmbH

( * ) Notice: Subject to any disclaimer, the term of this patent is extended or adjusted under 35 U.S.C. 154(b) by 0 days.

(21) Appl. No.: 16/638,087

(22) PCT Filed: Aug. 9, 2018

(86) PCT No.: PCT/EP2018/071681
§ 371 (c)(1),
(2) Date: Feb. 10, 2020

(87) PCT Pub. No.: WO2019/030345
PCT Pub. Date: Feb. 14, 2019

(65) Prior Publication Data
US 2020/0216024 A1    Jul. 9, 2020

(30) Foreign Application Priority Data
Aug. 11, 2017    (DE) .................... 10 2017 214 038.0

(51) Int. Cl.
*B60R 25/24* (2013.01)
*G07C 9/00* (2020.01)

(52) U.S. Cl.
CPC .......... *B60R 25/24* (2013.01); *G07C 9/00309* (2013.01); *B60R 2325/205* (2013.01); *G07C 2209/08* (2013.01)

(58) Field of Classification Search
CPC .. B60R 25/24; G07C 9/00309; G07C 2209/08
See application file for complete search history.

(56) References Cited

U.S. PATENT DOCUMENTS 5,723,911 A    3/1998    Glehr
9,836,892 B1*  12/2017   Nishiyama ............... G07C 1/32
(Continued)

FOREIGN PATENT DOCUMENTS

DE          10052451 A1     5/2002
DE       102011116209 A1    4/2012
(Continued)

OTHER PUBLICATIONS

International Search Report and Written Opinion dated Oct. 30, 2018 from corresponding International Patent Application No. PCT/EP2018/071681.
(Continued)

*Primary Examiner* — Daniell L Negron

(57) ABSTRACT

An anti-theft device for a vehicle has a vehicle transmitting device for emitting a signal. The device has a vehicle receiving device for receiving an identification transmitter signal. The device also has a vehicle control device which is configured to control a security device on the basis of the reception of an identification transmitter signal. In this case, the vehicle control device is also configured to deactivate the vehicle transmitting device if it has detected the capture of a user signal and the reception of at least one identification transmitter signal within a predetermined interval of time. This makes it possible to achieve a higher degree of security of the anti-theft device in a manner set by the user himself.

17 Claims, 1 Drawing Sheet

(56) References Cited

U.S. PATENT DOCUMENTS

| | | | |
|---|---|---|---|
| 2004/0130462 A1* | 7/2004 | Ueda | G07C 9/00309 |
| | | | 340/901 |
| 2009/0206990 A1 | 8/2009 | Nelson | |
| 2010/0217457 A1 | 8/2010 | Georgi et al. | |
| 2015/0048927 A1 | 2/2015 | Simmons | |
| 2016/0121849 A1* | 5/2016 | Kim | B60R 25/24 |
| | | | 701/2 |
| 2017/0113650 A1 | 4/2017 | Caushi | |
| 2019/0047511 A1* | 2/2019 | Link, II | B60R 25/24 |

FOREIGN PATENT DOCUMENTS

| | | |
|---|---|---|
| DE | 102011089794 A1 | 6/2013 |
| DE | 102015014208 A1 | 5/2017 |
| EP | 0673003 A1 | 9/1995 |
| EP | 0908589 A2 | 4/1999 |
| EP | 2098672 A1 | 9/2009 |
| GB | 2426102 A | 11/2006 |
| WO | 2009/037312 A1 | 3/2009 |

OTHER PUBLICATIONS

Office Action dated Mar. 23, 2018 from corresponding German Patent Application No. DE 10 2017 214 038.0.

* cited by examiner

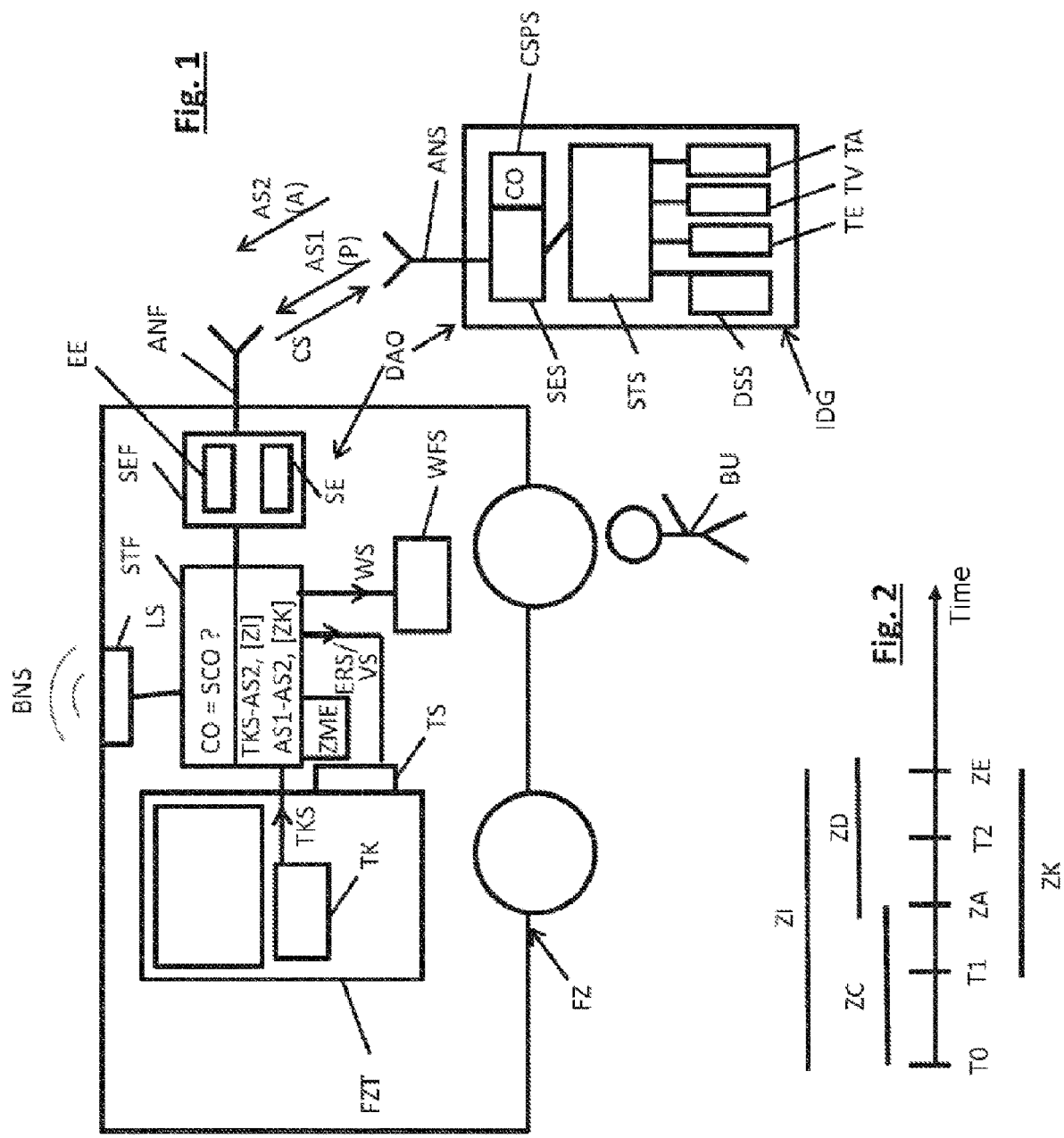

ANTITHEFT PROTECTIVE APPARATUS FOR A VEHICLE

The following invention relates to an anti-theft device for a vehicle, in which a user can independently adjust the level of security depending on his requirements.

In order to prevent unauthorized access to a vehicle, modern anti-theft devices, in particular access arrangements, use electronic security systems in which, for the authentication of a user, data communication takes place between a first vehicle communication device (such as a vehicle control unit with corresponding antennas) and a second communication device in a mobile identification transmitter belonging to a user (such as a radio key). In this case, the mobile identification transmitter in an active access arrangement transmits control signals and an identification code to the vehicle, for example as a result of an appropriate button being pressed by the user of the mobile identification transmitter, whereupon the vehicle is unlocked or locked if the identification code is correct.

In a so-called passive access arrangement, the first communication device of the vehicle is first of all triggered by a user to emit request signals with a specific field strength in order to check whether a mobile identification transmitter is in an approach area around the vehicle. If said identification transmitter can receive the request signals, it will respond to the reception of a request signal in order to initiate an authentication process or pre-authentication process. Data telegrams are exchanged in this case, in which the mobile identification transmitter ultimately transmits its specific code or authentication code to the vehicle. If the authentication code is checked successfully (corresponding comparison with a stored code), it is then possible for a user (who is located directly at the vehicle) to initiate unlocking of the corresponding vehicle door or of all the vehicle doors by actuating a door handle. Since a mechanical identification transmitter or a key does not have to be actively actuated by a user here, this type of access authorization is also referred to as a passive access authorization check and the corresponding systems are referred to as passive electronic access systems or passive access arrangements.

Not only in the case of an access arrangement, but also in the case of a start system (as part of an anti-theft device) for starting a drive motor (internal combustion engine or electric motor), it is possible for request signals to be transmitted to the mobile identification transmitter by a first vehicle communication device in order to receive a corresponding specific code from said identification transmitter. Since it is important for the engine to start that the driver or user is inside the vehicle, it is necessary in such a start system for a check to also be carried out in order to determine whether the user or his mobile identification transmitter is located inside the vehicle.

Low-frequency signals (for example in the range of 128 kHz) can be used as request signals both for an access system and for a start system, while high-frequency signals in the range of 433 MHz can be used as response signals. The problem with the security of such systems is that the respective high-frequency and low-frequency signals can be used with a mobile system of transmitting and receiving coils or radio antennas that is independent of the key of the vehicle, such that an unauthorized person at the vehicle can deactivate one of the abovementioned security devices (access system, start system), as mentioned, while another unauthorized person in the distance requests and eavesdrops on the signals from the mobile identification transmitter by extending the request signals and response signals. Such an extension of the radio paths by unauthorized persons is also referred to as a "middleman attack" or "relay attack" and represents a security risk in the case of passive access systems or passive access arrangements.

The object of the present invention is therefore to make it possible to improve the security of a vehicle, in particular with regard to unauthorized use.

This object is achieved by means of the subjects of the independent claims. The dependent claims relate to advantageous configurations.

In this case, a first aspect of the invention provides an anti-theft device for a vehicle having the following features. The device has a vehicle transmitting device for emitting a vehicle signal to a mobile identification transmitter. The device also has a vehicle receiving device for receiving an identification transmitter signal. The device also has a vehicle capture device for capturing a user signal as a trigger signal for the emission of the vehicle signal by the vehicle transmitting device. Finally, the anti-theft device has a vehicle control device which is configured to control a security device on the basis of the reception of an identification transmitter signal. Such a security device can comprise, for example, an access arrangement, including a locking device for one or more doors of the vehicle. However, it can also comprise a starting arrangement including an immobilizer which, when activated, prevents an engine from being able to be started. The vehicle control device is also configured to deactivate the vehicle capture device and/or the vehicle transmitting device if it has detected the capture of a user signal by the capture device and the reception of at least one identification transmitter signal by the vehicle receiving device within a first predetermined interval of time. In this way, it is conceivable for a user himself to improve the security of the anti-theft device by virtue of the possibility of passive access being switched off at his request by deactivating the vehicle transmitting device, and thus, for example in unsafe areas, there no longer being a fear of a middleman attack.

According to one configuration of the anti-theft device, it is conceivable for it furthermore to have a vehicle actuation device that can be actuated by a user, that is connected to the vehicle capture device and that is configured to detect the user signal from a user. In this case, the actuation device can comprise, for example, an operating element on the outside of the vehicle, such as a button or a switch or a touch-sensitive display that can be touched by the user in order to be actuated. This actuation can then be detected as a trigger signal for the emission of the vehicle signal. It is also conceivable that, instead of a sensor element for capturing touch, the actuation device has an optical sensor element, such as a camera, which is able to recognize certain gestures of a user as a user signal which in turn can serve as a trigger signal for the emission of the vehicle signal. Finally, it is also conceivable for the actuation device to have an acoustic sensor element, such as a microphone, in order to interpret certain noises or words of a user as a user signal or trigger signal for the emission of the vehicle signal.

As already mentioned above, the idea behind the deactivation of the vehicle capture device or vehicle transmitting device is to switch off the possibility of passive access by deactivating these devices. In order to achieve such switching-off, the following user actions can be captured by the following devices. First, the vehicle capture device (via the vehicle actuation device) can receive a user signal for the purpose of (passively) locking the vehicle or the doors of the vehicle. By capturing the user signal as a trigger signal, the vehicle transmitting device will correspondingly emit a vehicle signal to a mobile identification transmitter. Triggered by this, the mobile identification transmitter will send back an identification transmitter signal which is received by the vehicle receiving device. In addition to this, for the purpose of switching off the passive access possibility, the user will now actively trigger a further identification transmitter signal, in particular an identification transmitter signal with the purpose of locking, by means of his mobile identification transmitter (for example by actuating a corresponding button). The vehicle transmitting device will now check whether the capture of the user signal for passive locking and the reception of the identification transmitter signal (actively triggered by the user on the identification transmitter) are within the predetermined interval of time. If this condition is met, the vehicle control device will deactivate the vehicle transmitting device. Although it has just been described that the vehicle control device deactivates the vehicle capture device or vehicle transmitting device if it has detected a passive and an active locking signal within the first predetermined interval of time, it is also conceivable for the deactivation to also take place when a passive and an active unlocking signal are detected.

In order to now be able to better differentiate the (first) identification transmitter signal possibly triggered in the course of passive locking by emission of the vehicle signal from the (second) identification transmitter signal effected directly or actively by the user on the mobile identification transmitter, it is conceivable to limit the time window for the mentioned (second) directly effected identification transmitter signal. It is therefore conceivable, according to one configuration, for the vehicle control device to deactivate the vehicle capture device or vehicle transmitting device only if a further condition is present, namely if at least one predetermined second interval of time exists between the capture of the user signal by the vehicle capture device and the reception of the at least one identification transmitter signal.

According to a further aspect of the invention, an anti-theft device for a vehicle comprises the following features. The device has a vehicle transmitting device for emitting a vehicle signal to a mobile identification transmitter. The device also has a vehicle receiving device for receiving an identification transmitter signal. Finally, the device has a vehicle control device which is configured to control a security device on the basis of the reception of an identification transmitter signal, wherein the vehicle control device is also configured to deactivate the vehicle transmitting device (or a vehicle capture device for capturing a user signal as a (passive) trigger signal for the emission of the vehicle signal by the vehicle transmitting device) if at least two identification transmitter signals are received by the vehicle receiving device within a third predetermined interval of time, wherein one of the at least two identification transmitter signals is a triggered signal preceded by the emission of a vehicle signal and a second of the at least two identification transmitter signals is a direct signal not preceded by emission of a vehicle signal. As already mentioned above, the basis taken here is also again the idea of switching off a passive access possibility by virtue of the vehicle transmitting device (or the vehicle capture device) being deactivated by the vehicle control device if, again triggered by a user, a triggered signal (for example by actuating a vehicle actuation device) for passive access or passive locking and a direct signal (for example actuating a button on the identification transmitter) are detected within a predetermined interval of time (the third interval of time). In this way, the security of the anti-theft device can be increased, particularly in unsafe areas, in a manner determined by the user himself, since no more middleman attacks with a passive access attempt are then possible.

According to one configuration of the anti-theft device just described, the vehicle control device deactivates the vehicle transmitting device (or the vehicle capture device) when a particular combination of one or more triggered signals and one or more direct signals is received by the vehicle receiving device. In this way, the user satisfaction of the anti-theft device can be increased, since the vehicle transmitting device cannot be deactivated accidentally, but only by realizing the particular combination.

According to one configuration of the anti-theft device, in particular of the second aspect, an identification transmitter signal can comprise a first identifier which indicates whether the identification transmitter signal is a triggered signal. It is also conceivable for the first identifier to indicate whether the identification transmitter signal is a direct signal from the identification transmitter. In this way, the structure of the anti-theft device can be simplified since, for the anti-theft device to function reliably, only the vehicle receiving device has to be monitored by the vehicle control device with respect to the reception of identification transmitter signals, since the first identifier in the identification transmitter signals already contains sufficient information which allows the vehicle control device to conclude whether a user would like to deactivate the passive access function.

According to a further configuration of an anti-theft device of both aspects, an identification transmitter signal comprises a second identifier which indicates whether the identification transmitter signal is an activation signal or a deactivation signal (or locking signal or unlocking signal) for the security device. In this case, the activation signal can be a signal that is used, for example, to lock a locking device for one or more doors of the vehicle or to activate an immobilizer of the vehicle. On the other hand, a deactivation signal can serve as an unlocking signal for a locking device or a deactivation signal for an immobilizer of the vehicle.

According to a further configuration, the identification transmitter signal comprises a code which is compared with a desired code by the vehicle control device which controls the security device on the basis of the comparison. In particular, if the code transmitted with the identification transmitter signal corresponds to the desired code (which is stored, for example, in the vehicle control device), the security device can be controlled, activated or deactivated as desired, which does not occur if the comparison of the two codes does not provide a match.

According to a further configuration, the vehicle control device is also configured to reactivate the vehicle transmitting device (and/or the vehicle capture device) if it has detected the reception of an activation signal in the form of an identification transmitter signal or actuation of a vehicle activation device. In this case, an activation signal from the identification transmitter can be achieved by means of an unlocking signal in the context of an active access mode, for example by pressing an unlocking button on the identification transmitter. On the vehicle side, it is conceivable for the vehicle transmitting device to be activated by actuating a special vehicle activation device which is provided, for example, as part of a vehicle user interface, such as in the infotainment system (navigation, radio system). However, it is conceivable for the vehicle activation device to be implemented in the form of a mechanical emergency lock on the vehicle, which is actuated by actuation by means of a mechanical key bit, such as the emergency key of the mobile identification transmitter, in order to thus reactivate the vehicle transmitting device.

According to a further configuration, the anti-theft device also has a mobile identification transmitter which is configured to emit an identification transmitter signal, on the one hand in response to a user request or, on the other hand, in response to the reception of a vehicle signal. In this case, the mobile identification transmitter may be a key, a keyring, a mobile telephone (in particular in the form of a smartphone or an intelligent telephone) or an electronic wristband, for example in the function of a fitness tracker (fitness monitoring device).

According to a further configuration, the anti-theft device has an output device which outputs an item of user information relating to the deactivation of the passive access function or the deactivation of the vehicle transmitting device (or the vehicle capture device). In this case, the output device can have a vehicle output element, such as an optical display element, in order to indicate to the driver that no passive access is currently possible. It is entirely conceivable for the output device to have an identification transmitter output element. In particular in the configuration of the mobile identification transmitter as a mobile telephone or smartphone, it is conceivable here for the vehicle to transmit the current activation state of the vehicle transmitting device to the mobile telephone or smartphone via a radio interface, so that said state can be indicated to the user either optically, acoustically or else mechanically by means of specific vibration. In this way, the comfort of the anti-theft device is increased.

Exemplary embodiments of the present invention shall now be explained in more detail below with reference to the accompanying drawings, in which:

FIG. 1 shows a schematic illustration of a vehicle having an anti-theft arrangement according to one embodiment of the invention;

FIG. 2 shows a timeline for explaining the events taking place during operation of the anti-theft arrangement.

Reference shall first of all be made to FIG. 1 which shows a schematic illustration of a vehicle FZ having the essential components of an anti-theft arrangement DAO, in particular for preventing unauthorized access according to one embodiment of the invention. Viewed from right to left, the mobile part of the anti-theft arrangement is shown first, namely a mobile identification transmitter IDG that can be carried by a user. This can be designed, for example, in the form of a radio key or else in the form of a smartphone. In this case, the mobile identification transmitter IDG comprises an antenna ANS for receiving vehicle signals CS which are then forwarded to an identification transmitter transmitting/receiving device SES. This transmitting/receiving device SES further comprises a memory CSPS in which an individual code CO of the identification transmitter IDG is stored. The identification transmitter transmitting/receiving device is connected to an identification transmitter control device STS. Three buttons or operating elements which can be actuated by a user, namely a first button TE for causing unlocking of the vehicle FZ, a button TV for causing locking of the vehicle FZ, and a button TA for activating the vehicle transmitting device, are then connected to this identification transmitter control device STS, as will be explained in yet more detail later. In addition, the mobile identification transmitter IDG also has an identification transmitter output device in the form of an optical display DSS for outputting certain user information, such as the activation state of the vehicle transmitting device.

The vehicle part of the anti-theft arrangement comprises a vehicle control unit STF, to which a vehicle memory (not illustrated) is assigned, in which a predetermined code SCO is stored as the desired code. Furthermore, the vehicle control unit STF is connected to a vehicle transmitting/receiving device SEF which has a vehicle transmitting device SE for emitting a vehicle signal CS and a vehicle receiving device for receiving identification transmitter signals AS1 and AS2. In this case, the respective signals are emitted and received via a vehicle antenna ANF.

It is conceivable in this case for the vehicle signal (request signal) CS to be a low-frequency signal at approximately 125 kHz, while the identification transmitter signals can be high-frequency signals at a frequency of approximately 433 MHz. However, it is also conceivable for both the vehicle signals and the identification transmitter signals to be in a license-free ISM band (industrial scientific and medical band) between 2.402 GHz and 2.480 GHz for Bluetooth communication. However, it is also conceivable for the respective radio signals to be in a frequency range of 13.56 MHz in order to implement communication in accordance with an NFC (near field communication) standard.

Furthermore, the vehicle control unit STF is connected to a first security device in the form of a door lock TS (as a locking device) which is representative of an access arrangement for unlocking and locking one or more vehicle doors FZT. Furthermore, the vehicle control unit STF is connected to a second security device in the form of an immobilizer WFS which, in the deactivated case, allows a drive motor (not illustrated) to be started.

It is now assumed that a user BU approaches the vehicle FZ and wants to gain access to it. For this, he chooses a passive access route. For this purpose, the user BU will actuate a button TK which is located on the outside of the vehicle door FZT, in particular in the door handle. Actuating the button TK, which can be understood as an actuation device, causes a signal TKS to be sent to the vehicle control device STF. In this case, the vehicle control device STF also serves as a capture device for capturing a user signal as a trigger signal for the emission of a vehicle signal. Accordingly, the vehicle control device STF will communicate with the vehicle transmitting device SEF and cause it to emit a vehicle signal CS to the mobile identification transmitter IDG via the vehicle antenna ANF. If the mobile identification transmitter receives the vehicle signal CS via the identification transmitter antenna ANS, the identification transmitter transmitting/receiving device SES will read out the code CO stored in the memory CSPS and send it back to the vehicle via a first response signal or identification transmitter signal AS1. The first identification transmitter signal AS1 is then received via the vehicle antenna ANF and the vehicle receiving device EE and forwarded to the vehicle control device STF. The latter then checks whether the transmitted code CO corresponds to the predetermined desired code SCO. If this is the case, the vehicle control device STF will cause the door lock TS, by means of an unlocking signal ERS, to unlock the vehicle door FZT so that the user BU can get into the vehicle.

The user, who has now gotten into the vehicle FZ and wants to start its drive motor, can for example actuate a start-stop button (not illustrated) in the passenger compartment for this purpose. As described above with regard to the passive access process, a corresponding start request signal is sent in this case to the vehicle control apparatus STF which then obtains a valid code CO again by means of a question-answer dialog via the signals CS and AS1, or carries out authentication for the starting process. In the positive case, in which the code comparison is positive, the vehicle control device will then send an enable signal WS to the immobilizer WFS so that the latter is deactivated and make it possible to start the drive motor.

The case in which the user BU would like to leave the vehicle with the vehicle door FZT unlocked and would like to lock the vehicle door FZT accordingly shall now be considered. For this purpose, the user BU actuates the button TK again in order to trigger the signal TKS, the same method steps now being carried out again by the vehicle control apparatus and the following components in order to obtain and compare the code from the assigned identification transmitter IDG. With a corresponding positive code comparison (the code CO corresponds to the desired code SCO), a signal is again output to the door lock TS, this time the output of a locking signal VS for locking the door lock.

It is also again conceivable for the user to carry out direct or active locking via the identification transmitter IDG by sending an identification transmitter signal AS2 to the vehicle FZ by pressing the button TV in a similar manner to the unlocking described above, which signal is received by the vehicle, and a code comparison is again carried out there in the vehicle control apparatus STF. With a corresponding positive code comparison, the locking signal VS can again be output to the door lock TS for locking even with this active or direct locking request.

As mentioned at the outset, there is now the problem, particularly in the case of the passive access process or passive unlocking process, that the radio path between the vehicle and the mobile identification transmitter can be extended by third parties or thieves in order to carry out a middleman attack. Especially in certain areas or in certain situations in which the intention is possibly to have the vehicle parked for longer (such as at an airport), it would be advantageous to easily improve the security of the anti-theft arrangement DAO.

For this purpose, it is now conceivable for the user BU to be able to independently increase the security of the anti-theft arrangement and, for example, be able to switch off the passive access function. This switching-off of the passive access function can take place by virtue of, for example, the vehicle transmitting device SE or the function of a capture device of the vehicle control device for capturing the actuation of the operating element or the button TK (as a trigger signal for passive unlocking or locking) being deactivated. According to one embodiment of the invention, this can take place by virtue of the user BU in particular first initiating a passive locking process on the vehicle by actuating the button TK and then additionally initiating an active locking process within a specific interval of time ZI, for example by pressing the button TV on the mobile identification transmitter. If the vehicle control apparatus STF detects this combination of a passive locking request in an active locking request within the predetermined interval of time ZI, it will then deactivate the vehicle transmitting device SE and/or the function of the capture device. The vehicle control device STF can measure times or intervals of time by means of a time measuring device ZME.

More specifically, it is conceivable for the vehicle control apparatus to actuate the button TK at the time T0 with reference to FIG. 2. Accordingly, the first identification transmitter signal AS1 is triggered via the vehicle signal CS. Its reception is determined at the time T1 by the vehicle receiving device EE after approximately 0.5 seconds. By pressing the button TV, the user BU will now cause a second identification transmitter signal AS2 to be emitted. This is then received by the vehicle receiving device EE at the time T2.

It is therefore possible for the vehicle control apparatus STF to detect a combination of a passive and active locking request by means of several possibilities and to use this to deactivate the vehicle transmitting device SE or the function of the capture device.

On the basis of the statements made above, the practice of detecting the combination of a passive and an active access request just mentioned for the vehicle control device STF now involves in detail recognizing, as the first readout signal, the actuation of the button TK for the passive locking request at the time T0. As illustrated in FIG. 2, on the one hand, the reception of the first identification transmitter signal AS1 is now to be expected at the time T1 and later on the reception of the directly emitted identification transmitter signal AS2 due to the active locking request at the time T2. Thus, on the one hand, according to one embodiment, it is possible for the vehicle control device STF to recognize the detection of the passive and active locking request for the purpose of deactivating the vehicle transmitting device (or the function of the capture device) by virtue of the fact that, starting from the pressing of the button TK at the time T0, two identification transmitter signals AS1 and AS2 must be received within a predetermined interval of time ZI. This interval of time ZI can be set to 3 seconds, since two conscious actions by the user can be expected within this time.

However, according to a further embodiment, it is also conceivable that, starting from the pressing of the button TK at the time T0, an identification transmitter signal AS2 is received by the vehicle within a predetermined interval of time ZD, namely the signal caused by the active locking request. The interval of time ZD is then to be set in terms of time after the time T0 such that it is after the expected arrival of the triggered identification transmitter signal AS1 (time T1). For example, the interval of time ZD can be between the time ZA (approximately 1 second after the time T0) and the time ZE (approximately 3 seconds after the time T0). It is assumed here that the triggered identification transmitter signal AS1 is received approximately 0.5 seconds after actuating the button TK at the time T0. An interval of time ZC between the times T0 and ZA can thus be selected such that the reception of the first identification transmitter signal is not evaluated by the vehicle control device STF as a criterion for deactivating the vehicle transmitting device SE.

However, there is also a possibility according to a further embodiment of how the vehicle control device STF recognizes the detection of a combination of a passive and active locking request for the purpose of deactivating the vehicle transmitting device. For this purpose, it is conceivable for the vehicle control device STF to not use the actuation of the button TK at the time T0 as a trigger for the subsequent monitoring of received identification transmitter signals, but that it begins, for example, at the time T1 with the reception of the first identification transmitter signal AS1 which of course was again triggered by the user pressing the button TK. However, in this embodiment, it is not necessary for there to be a direct connection between the button TK and the vehicle control device STF, via which corresponding actuation of the button TK must be communicated by means of a signal TKS. Rather, only a connection between the vehicle control device STF and the vehicle receiving device EE is necessary here. If the vehicle control device STF has now detected the reception of the first identification transmitter signal AS1 at the time T1, it will now check whether another identification transmitter signal AS2 is received by the vehicle receiving device EE within a further interval of time ZK (starting with the time T1 and ending with the time ZE). If this is the case, the criteria for deactivating the vehicle transmitting device SE are also again given here.

In order to be able to clearly differentiate between triggered identification transmitter signals AS1 (due to a passive access/locking request) and direct identification transmitter signals AS2 (due to an active access/locking request), in particular in the latter case, it is conceivable for the identification transmitter signals AS1 and AS2 to have an identifier containing an item of information about which of the processes triggered the emission of the identification transmitter signal. For example, the first identification transmitter signal AS1 may contain an identifier with the information "P" in order to identify the origin of a passive access/locking request, and the second identification transmitter signal AS2 may contain an identifier with the information "A" in order to identify the origin of an active access/locking request.

It is also conceivable for the identification transmitter signals to have a further identifier with an item of information as to whether an unlocking instruction or a locking instruction should be included with the identification transmitter signal, particularly in the case of an active access/locking request.

The activation state or deactivation state of the vehicle transmitting device SE or the function of the capture device of the vehicle control device STF can be output by means of a vehicle output device, such as a loudspeaker LS, in the form of an acoustic signal BNS, or else on the display device DSS on the mobile identification transmitter.

The invention claimed is:

1. An anti-theft device for a vehicle, comprising:
   a vehicle transmitting device configured to emit a vehicle signal to a mobile identification transmitter;
   a vehicle receiving device configured to receive an identification transmitter signal;
   a vehicle control device configured to control a security device based on a reception of an identification transmitter signal,
   wherein the vehicle control device is also configured to deactivate the vehicle transmitting device if at least two identification transmitter signals have been received by the vehicle receiving device within a predetermined interval of time, and
   wherein one of the at least two identification transmitter signals is a triggered signal preceded by an emission of a vehicle signal and a second of the at least two identification transmitter signals is a direct signal not preceded by emission of a vehicle signal.

2. The anti-theft device as claimed in claim 1, wherein the vehicle control device deactivates the vehicle transmitting device if a particular combination of one or more triggered signals and one or more direct signals has been received by the vehicle receiving device.

3. The anti-theft device as claimed in claim 1, wherein an identification transmitter signal comprises a first identifier which indicates whether the identification transmitter signal is at least one of a triggered signal and a direct signal.

4. The anti-theft device as claimed in claim 1, wherein an identification transmitter signal comprises a second identifier which indicates whether the identification transmitter signal is at least one of an activation signal and a deactivation signal for the security device.

5. The anti-theft device as claimed in claim 1, wherein an identification transmitter signal comprises a code which is compared with a desired code by the vehicle control device which controls the security device based on the comparison.

6. The anti-theft device as claimed in claim 1, wherein the vehicle control device is also configured to reactivate the vehicle transmitting device if the vehicle control device detected a reception of an activation signal as an identification transmitter signal or actuation of a vehicle activation device.

7. The anti-theft device as claimed in claim 1, further comprising a mobile identification transmitter configured to emit an identification transmitter signal in response to one of a user request and a reception of a vehicle signal.

8. The anti-theft device as claimed in claim 1, wherein the mobile identification transmitter is at least one of a key, a keyring, an electronic wristband and a mobile telephone.

9. The anti-theft device as claimed in claim 1, further comprising an output device configured to output an item of user information relating to an activation state of the vehicle transmitting device.

10. An anti-theft arrangement for a vehicle, comprising:
    a vehicle transmitting device configured to emit a vehicle signal to a mobile identification transmitter;
    a vehicle receiving device configured to receive an identification transmitter signal;
    a vehicle capture device configured to capture a user signal as a trigger signal configured to trigger an emission of the vehicle signal by the vehicle transmitting device;
    a vehicle control device which is configured to control a security device based on a reception of at least one identification transmitter signal,
    wherein the vehicle control device is also configured to deactivate at least one of the vehicle transmitting device and the vehicle capture device if the vehicle control device detected a capture of a user signal by the vehicle capture device and the reception of at least one identification transmitter signal by the vehicle receiving device within a first predetermined interval of time;
    wherein the vehicle control device deactivates the vehicle transmitting device if there is at least a predetermined second interval of time between the capture of the user signal by the vehicle capture device and a reception of the at least one identification transmitter signal; and
    wherein the vehicle control device is also configured to deactivate the vehicle transmitting device if at least two identification transmitter signals have been received by the vehicle receiving device within a third predetermined interval of time, and wherein one of the at least two identification transmitter signals is a triggered signal preceded by an emission of a vehicle signal and a second of the at least two identification transmitter signals is a direct signal not preceded by emission of a vehicle signal.

11. The anti-theft arrangement as claimed in claim 10, wherein the vehicle control device deactivates the vehicle transmitting device if a particular combination of one or more triggered signals and one or more direct signals has been received by the vehicle receiving device.

12. The anti-theft arrangement as claimed in claim 10, wherein an identification transmitter signal comprises a first identifier which indicates whether the identification transmitter signal is at least one of a triggered signal and a direct signal.

13. The anti-theft arrangement as claimed in claim 10, wherein an identification transmitter signal comprises a second identifier which indicates whether the identification transmitter signal is at least one of an activation signal and a deactivation signal for the security device.

14. The anti-theft arrangement as claimed in claim 10, wherein an identification transmitter signal comprises a code which is compared with a desired code by the vehicle control device which controls the security device based on the comparison.

15. The anti-theft arrangement as claimed in claim 10, wherein the vehicle control device is also configured to reactivate the vehicle transmitting device if the vehicle control device detected a reception of an activation signal as an identification transmitter signal or actuation of a vehicle activation device.

16. The anti-theft arrangement as claimed in claim 10, further comprising a mobile identification transmitter configured to emit an identification transmitter signal in response to one of a user request and a reception of a vehicle signal.

17. The anti-theft arrangement as claimed in claim 10, wherein the mobile identification transmitter is at least one of a key, a keyring, an electronic wristband and a mobile telephone.

* * * * *